United States Patent [19]
Takamatsu et al.

[11] 4,120,516
[45] Oct. 17, 1978

[54] COVER MEMBER FOR A SAFETY AIR-CUSHION DEVICE AND A METHOD OF PRODUCING THE SAME

[75] Inventors: Yukio Takamatsu, Ikeda; Takashi Wakabayashi, Toyonaka; Hideyo Noda, Kyoto; Kiyoshi Ichikawa, Tokyo; Tsuneteru Kamegai, Yokosuka; Kazuo Ikawa, Yokohama, all of Japan

[73] Assignee: Nissan Motor Company, Limited, Japan

[21] Appl. No.: 746,713

[22] Filed: Dec. 2, 1976

[30] Foreign Application Priority Data

Dec. 5, 1975 [JP] Japan .................... 50-162886[U]

[51] Int. Cl.² ............................................. B60R 21/10
[52] U.S. Cl. .................................. 280/728; 264/46.7; 428/315
[58] Field of Search ......................... 280/728–734, 280/736–743; 264/46.7; 428/12, 68, 71, 76, 310, 315; 180/90

[56] References Cited

U.S. PATENT DOCUMENTS

| | | | |
|---|---|---|---|
| 2,860,003 | 11/1958 | Hodges | 280/732 X |
| 3,539,200 | 11/1970 | Chute | 280/731 |
| 3,622,176 | 11/1971 | Byer | 180/90 |
| 3,625,543 | 12/1971 | Wolff | 280/740 |
| 3,794,349 | 2/1974 | Fuller | 180/90 |
| 3,840,627 | 10/1974 | Rhodes | 180/90 |
| 3,887,214 | 6/1975 | Brawn | 280/730 |
| 3,907,330 | 9/1975 | Kondo | 280/731 |
| 3,922,429 | 11/1975 | Welch | 428/315 |
| 4,054,706 | 10/1977 | Shapiro | 428/315 |

*Primary Examiner*—Kenneth H. Betts

[57] ABSTRACT

A cover member for a safety air-cushion device is made up of a bag-shaped outer laminate of high density polyurethane foam, and a bag-shaped inner laminate of low density polyurethane foam which is integral with the outer laminate, the inner laminate being made by pouring the fluidized material into a mold after solidification of the other fluidized material having been poured into the mold for the formation of the outer laminate.

4 Claims, 1 Drawing Figure

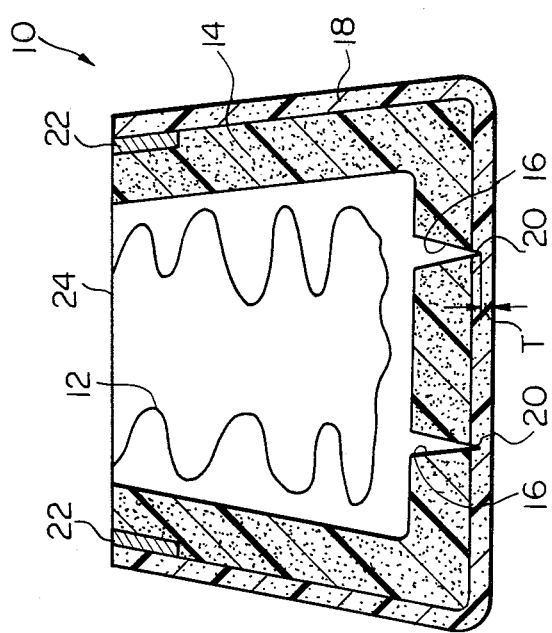

COVER MEMBER FOR A SAFETY AIR-CUSHION DEVICE AND A METHOD OF PRODUCING THE SAME

The present invention relates in general to a safety air-cushion device for protecting an occupant of a vehicle during a vehicle collision, and more particularly to a cover member for substantially covering the air-cushion device proper in a dormant condition in order that the air-cushion device proper should not be damaged by accidental striking by the occupant's body and/or appendage.

It is well known in the art that each of the cover members for such air-cushion devices is constructed to have at least one easily breakable portion or at least one cut portion in order that the cover member is positively broken by the expansion of the air-cushion proper so as to allow the air-cushion proper to quickly get out from the cover member for the full expansion in case of a vehicle collision. On the contrary, the cover member should not be broken nor removed from its originally set position even when subjected to violent vibrations or shocks which are made by causes other than the expansion of the air-cushion.

In regard to the selection of material forming such a cover member, it is necessary that the material should have low density, low cost productivity and good colourability. Especially, for safety's sake, the material should not generate harmful gases or produce dangerous rigid crushed pieces when broken.

Hitherto, some of such cover members have been made up of two layers of different plastic materials. For example, the top side layer for the cover member is made of a rigid plastic laminate, such as PVC resin (polyvinyl-chloride resin) and ABS resin (acrylonitrile-butadiene-styrene resin), and the back side layer of the cover member is made of a foamed polyurethane laminate which is adhered to the inside surface of the rigid plastic laminate. In this case, however, when a temperature applied to such combined laminates of the cover member as a result of the curing operation and/or the exothermic reaction of the fluidized polyurethane material reaches a certain temperature, the laminates are subjected to deformation causing unwanted variations in the respective thicknesses thereof. In addition, because the flexibility of the PVC resin or the ABS resin for the top side layer is remarkably lowered in a cold condition, many cracks may appear in such layers in a very cold condition even when the cover member is subjected to only slight shocks. Besides, the vacuum forming process applied to the formation of the rigid plastic laminates is likely to induce occurrence of some shrinkages on the surface of them and of ill-balanced thicknesses of the laminates, thereby badly affecting the appearance of the cover member, unwantedly. Furthermore, when such laminates are used in the vehicle, certain amounts of plasticizers contained therein evaporate in the vehicle compartment thus causing a dangerous fogging phenomenon.

Some cover members have been made of so-called integral skin polyurethane laminates. As is well known, the integral skin polyurethane laminate is produced by a so-called single shot molding process and has a body the density of which is continuously decreased from the surface portion thereof toward the inner portion thereof. However, in this case, it is very difficult to provide an article having a well finished surface which promotes the exact formation of the cut portion because of employing the complicated single shot molding process. In reality, by such molding process, there have been produced many substandard articles having very rough surfaces. One of the methods for solving the above-mentioned drawbacks on the integral skin polyurethane laminate is to allow the inner portion of the article to have higher density, for example, ranging from about 0.4 g/cm$^3$ to 0.8 g/cm$^3$. However, in this condition, the weight of the article and thus the total weight of the cover member are unwantedly increased inevitably. When the article is produced to have high density gradient for the purpose of reducing the weight thereof, not only partial shrinkages appear on the article to lower the appearnace thereof, but also the mechanical strength of the article is considerably decreased. In this case, therefore, some reinforcements, such as metals, inserted into the article are required to prevent the cover member from being cracked into several pieces upon the breakage of the cover member. However, this procedure will also induce some drawbacks, such as increase in weight of the cover member, the fear of permanent deformation of the cover member due to the deformation of the plastical reinforcements, and the danger of the rigid reinforcements being partially exposed from the cover member upon the vehicle collision.

Therefore, the present invention provides an improved cover member for the air-cushion device, which can eliminate the several drawbacks encountered in the conventional cover members mentioned above.

It is an object of the present invention to provide an improved cover member which is made up by a bag-shaped inner polyurethane laminate of low density and a bag-shaped polyurethane outer laminate of high density, the inner polyurethane laminate being made by injecting the fluidized material into a mold after solidification of the other material having been poured into the mold for the formation of the outer polyurethane laminate.

It is another object of the present invention to provide an improved cover member, having at least one cut or slit portion which is used for readily and positively breaking the cover member, when the expansion of the air-cushion occurs, to quickly get out from the cover member for full expansion in a case of the vehicle collision.

It is still another object of the present invention to provide an improved molding method for the production of the cover member mentioned above.

Other objects and advantages of the present invention will become apparent from the following description when taken in conjunction with the accompanied single drawing of the cover member.

Referring to the single drawing, there is illustrated an improved cover member 10, according to the present invention, which substantially covers an air-cushion 12 in a dormant condition as illustrated in solid lines. The cover member 10 comprises a bag-shaped inner polyurethane laminate 14 arranged to substantially hold in it the expansible air-cushion 12. The inner laminate 14 is formed to have a density ranging from about 0.2 g/cm$^3$ to about 0.5 g/cm$^3$ and is formed at the closed end portion thereof with two trapezoidal slits 16 which extend through the closed end portion. Covering the outer surface of the inner polyurethane laminate 14 is an outer polyurethane laminate 18 which has a density ranging from about 0.5 g/cm$^3$ to about 1.2 g/cm$^3$. As shown, the closed end portion of the outer laminate 18 is formed with two grooves 20 which are arranged to open to the before-mentioned slits 16 to form two substantially V-shaped cut portions in the cover member 10. Preferably, each of the V-shaped cut portions is formed to define a wall thickness of about 0.4 mm between the extending end thereof and the outer surface of the outer laminate 18, the wall thickness being indicated by the letter T in the drawing. Although in this drawing, two cut portions are provided, only one cut portion may be formed in the cover member 10 as long as the cover member 10 is readily and positively broken by the expansion of the air-cushion 12 in the case of the vehicle collision. Designated by the reference numeral 22 are metal supports which have one of their ends firmly disposed in the inner laminate 14 at positions adjacent an opening 24 of the cover member 10. The other ends of the metal supports 22 are tightly connected to the vehicle body. With this construction, when the air-cushion 12 is suddenly expanded in response to the vehicle collision to thus strongly push the inner surface of the inner laminate 14 outward, the cover member 10 is opened along the cut portions thus allowing the air-cushion 12 to get out from the cover member 10 for the full expansion of the air-cushion 12.

In regard to the molding method of the above-mentioned cover member 10, the following procedures will be required.

A first fluidized urethane resin is poured or injected into a female mold having a desired-shaped recess the contour of which is similar to the outline of the outer laminate 18 shown in the drawing. Just after the viscosity of the first fluidized urethane resin proceeds to a degree beyond 10,000 cps, a first male mold having an outer surface with two first projections extending outwardly is inserted into the recess of the female mold so as to give an active pressure above 500 g/cm$^2$ to the first fluidized urethane resin. By this procedure, the insertion of the first male mold into the female mold should be made so that the leading ends of the projections do not reach the inner surface of the recesses of the female mold by the reason as will be described hereinlater. After solidification of the first urethane resin, the first male mold is removed from the female mold while leaving the solidified polyurethane resin in the recess of the female mold. With these procedures, the outer polyurethane laminate 18 is prepared with a uniform density thereof and two cut portions 20 on the inner surface portion thereof. Of course, before pouring the first fluidized urethane resin into the female mold, consideration for the selection of the urethane materials and the operating parameters of the urethane pouring machine should be given by the operator in order that the solidified outer laminate 18 will have the density thereof ranging from about 0.5 g/cm$^3$ to about 1.2 g/cm$^3$.

Then, a second male mold having an outer surface with two second projections extending outwardly is inserted into a bore having been formed in the solidified outer polyurethane laminate 18, in such manner that the leading ends of the second projections are received in the two cut portions of the outer laminate 18 while providing a certain clearance between the inner surface of the outer laminate 18 and the outer surface of the second male mold. Before the second male mold is inserted into the bore of the outer laminate 18, suitable numbers of metal supports 22 are releasably fixed to the second male mold. These metal supports 22 are positioned to attach the inner surface of the outer laminate 18 adjacent the opening of it. Then a second fluidized urethane resin is poured or injected into the before-mentioned clearance formed between the inner surface of the outer laminate 18 and the outer surface of the second male mold. After solidification of the second urethane resin, the second male mold is released or removed from the solidified second resin while leaving the metal supports in the solidified second resin. With this, the inner polyurethane laminate 14 is made. Finally, the female mold is released from the combined outer and inner polyurethane laminates 18 and 14. It is to be noted that the materials and the operating parameters of the urethane pouring machine for the second fluidized urethane resin are selected and controlled so that the solidified inner polyurethane laminate will have the density ranging from about 0.2 g/cm$^3$ to about 0.5 g/cm$^3$. With these procedures, the combined article as shown in the drawing can be produced.

EXAMPLE

The following Tables I and II show the respective properties of the solidified outer and inner polyurethane laminates 18 and 14 which were produced by employing the above-described molding method.

Table I

| | Property of the Solidified Outer Polyurethane Laminate (18) | | | |
|---|---|---|---|---|
| | Curing time Weight | 17 seconds 176 g | | |
| | Measuring temperature (° C) | | | |
| Mechanical property | −40 | −20 | +20 | +80 |
| Tensile strength (Kg/cm$^2$) | 309 | 200 | 124 | 48 |
| Elongation (%) | 330 | 340 | 380 | 230 |
| Flexural modulus at 50% compression (Kg/cm$^2$) | 135 | 65 | 37 | 28 |
| Tear resistance (Kg/cm) | 106 | 69 | 31 | 20 |
| Hardness of Shore · D | 43 | 35 | 32 | 27 |
| Hardness of Shore · D of a conventional half-hard PVC sheet of 0.8 mm in thickness | 74 | 68 | 52 | 26 |

Table II

| | Property of the Solidified Inner Polyurethane Laminate (14) | | | |
|---|---|---|---|---|
| | Curing time Weight | 20 seconds 84 g | | |
| | Measuring temperature (° C) | | | |
| Mechanical property | −40 | −20 | +20 | +80 |
| Tensile strength (Kg/cm$^2$) | 98 | 82 | 22 | 14 |
| Elongation (%) | 71 | 100 | 190 | 69 |
| Flexural modulus at 50% compression (Kg/cm$^2$) | 94 | 66 | 12 | 13 |
| Tear resistance (Kg/cm) | 29 | 26 | 11 | 6 |

*The combined article consisting of these laminates 18 and 14 is considerably lighter than an article made of the before-mentioned integral skin polyurethane foam.

According to our several practical experiments, the following results were further obtained.

(1) The formation of the cut portions in the cover member 10 was accurate, so that the dimensional uniformity of thickness of the wall defined by the extending end of each cut portion and the outer surface of the outer polyurethane laminate 18 is considerably improved.

(2) The unwanted cracks in the cover member 10 did not appear even when the subject cover member was left in a very cold condition for a long time.

(3) The wear proof of the outer laminate 18 was far better than the integral skin foam mentioned before.

(4) The dangerous fogging phenomenon did not occur even when the cover member 10 was used in a motor vehicle cabin. This is because the urethane resin does not contain much plasticizers.

(5) It was easy to increase the reaction rate of each of the urethane materials since these materials are individually used for the respective formations of the outer and inner polyurethane laminates 18 and 14. Thus, the projection rate and thus the production efficiency of the cover member were remarkably increased. More specifically, each cover member of the present invention was produced every 6 to 8 minutes while the conventional cover member such as made of the integral skin polyurethane foam took 15 to 20 minutes for the formation thereof.

(6) The cover member of the subject invention was made with a well finished outer surface, more specifically, without pin holes. This means that painting of the outer surface of the cover member is readily achieved even when a light color paint is used. In reality, in the conventional cover member of the integral skin polyurethane foam, only black paint is used since the outer surface of it is very rough.

What is claimed is:

1. A cover member for substantially covering an expansible air-cushion in a dormant condition, said expansible air-cushion being expanded to break said cover member and thus to get out from said cover member to protect an occupant of a vehicle at a vehicle collision, said cover member comprising:
    a bag-shaped inner laminate arranged to substantially cover up said expansible air-cushion in a dormant condition and having at least one slit extending through said inner laminate, said inner laminate being made of a relatively low density polyurethane foam; and
    a bag-shaped outer laminate arranged to cover the outer surface of said inner laminate and having at least one cut portion at its inner surface portion thereof, said outer laminate being made of a relatively high density polyurethane foam and said cut portion being positioned to open to said slit of said inner laminate.

2. A cover member as claimed in claim 1, in which said inner and outer laminates are integrated to each other at the contacting surfaces thereof.

3. A cover member as claimed in claim 2, further comprising at least one metal support which is firmly disposed between said inner and outer laminates at a position adjacent an opening portion defined by said bag-shaped inner laminate.

4. A cover member as claimed in claim 3, in which the densities of the respective inner and outer laminates are 0.2 to 0.5 gr/cm$^3$ and 0.5 to 1.2 gr/cm$^3$.

* * * * *

UNITED STATES PATENT AND TRADEMARK OFFICE
CERTIFICATE OF CORRECTION

PATENT NO. : 4120516
DATED : October 17, 1978
INVENTOR(S) : Yukio Takamatsu et al.

It is certified that error appears in the above-identified patent and that said Letters Patent are hereby corrected as shown below:

Change "Nissan Motor Company, Ltd" to --Nissan Motor Company, Ltd., Toyo Rubber Industry Company, Ltd. and Ikeda Bussan Company, Ltd.--.

Signed and Sealed this

Tenth Day of April 1979

[SEAL]

Attest:

RUTH C. MASON
Attesting Officer

DONALD W. BANNER
Commissioner of Patents and Trademarks